United States Patent
Cao et al.

(10) Patent No.: US 10,302,906 B2
(45) Date of Patent: May 28, 2019

(54) EYEPIECE OPTICAL SYSTEM FOR NEAR-EYE DISPLAY, AND HEAD-MOUNTED DISPLAY DEVICE

(71) Applicant: Shenzhen NED Optics Co., Ltd., Shenzhen, Guangdong (CN)

(72) Inventors: Hongpeng Cao, Guangdong (CN); Huajun Peng, Guangdong (CN)

(73) Assignee: Shenzhen NED Optics Co., Ltd., Shenzhen (CN)

(*) Notice: Subject to any disclaimer, the term of this patent is extended or adjusted under 35 U.S.C. 154(b) by 0 days.

(21) Appl. No.: 15/744,249

(22) PCT Filed: Apr. 20, 2016

(86) PCT No.: PCT/CN2016/079724
§ 371 (c)(1),
(2) Date: Jan. 12, 2018

(87) PCT Pub. No.: WO2017/181360
PCT Pub. Date: Oct. 26, 2017

(65) Prior Publication Data
US 2018/0203205 A1    Jul. 19, 2018

(51) Int. Cl.
*G02B 25/00* (2006.01)
*G02B 13/00* (2006.01)
*G02B 17/00* (2006.01)
*G02B 27/01* (2006.01)

(52) U.S. Cl.
CPC ....... *G02B 13/0035* (2013.01); *G02B 17/002* (2013.01); *G02B 25/001* (2013.01); *G02B 27/0172* (2013.01); *G02B 2027/011* (2013.01); *G02B 2027/0178* (2013.01)

(58) Field of Classification Search
CPC .............. G02B 13/0035; G02B 25/001; G02B 27/0172; G02B 17/002; G02B 2027/011; G02B 2027/0178
See application file for complete search history.

(56) References Cited

U.S. PATENT DOCUMENTS 7,180,675 B2    2/2007  Tamura et al.
8,531,774 B2 *  9/2013  Kubota ................ G02B 25/001
                                                    359/643

* cited by examiner

*Primary Examiner* — Joseph P Martinez

(57) ABSTRACT

An eyepiece optical system for a near-eye display, and a head-mounted display device are disclosed. The eyepiece optical system has a first lens, a reflection unit, a second lens, and a third lens group. An optical axis of the second lens and an optical axis of the third lens group are coaxially with each other and coaxially with an optical axis of the first lens when they are reflected by the reflection unit. The third lens group has a third lens. An optical surface of the first lens proximate to the eye viewing side is convex to an eye viewing direction, and an optical surface of the second lens proximate to the miniature image displayer side is concave to a miniature image displayer direction. The present eyepiece optical system has advantages such as compact structure, small size, high optical resolution and so on, which gives the best visual experience.

20 Claims, 12 Drawing Sheets

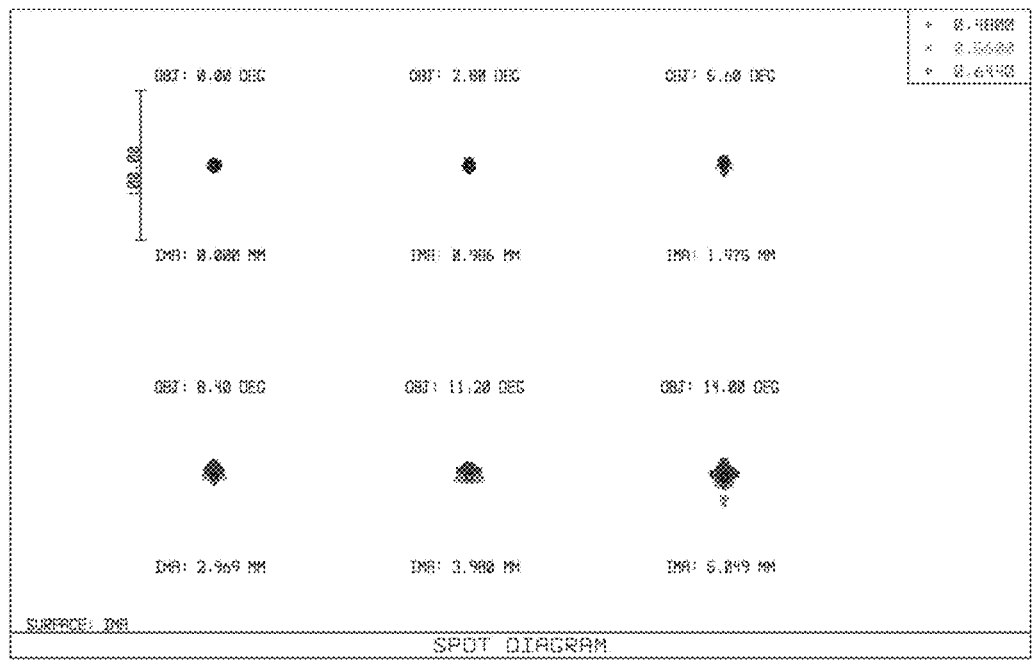
Fig.5
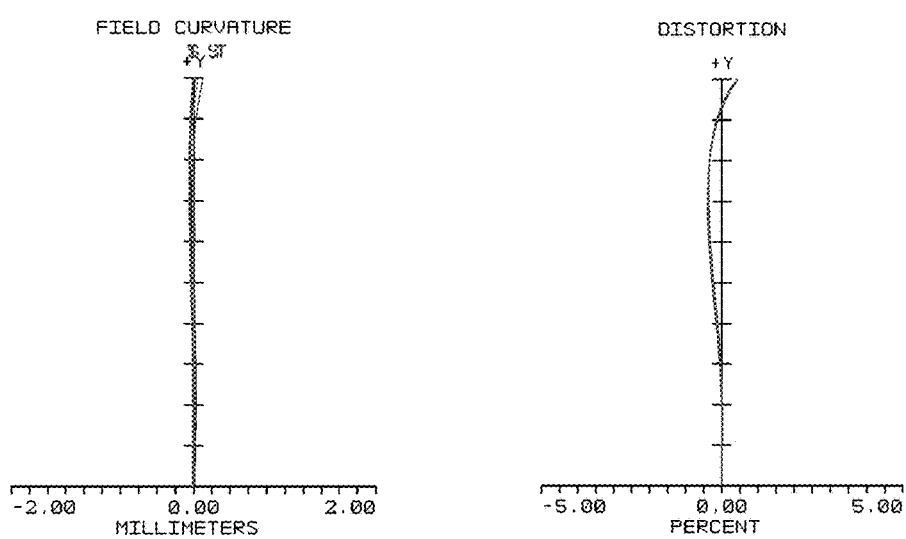
Fig.6a
Fig.6b

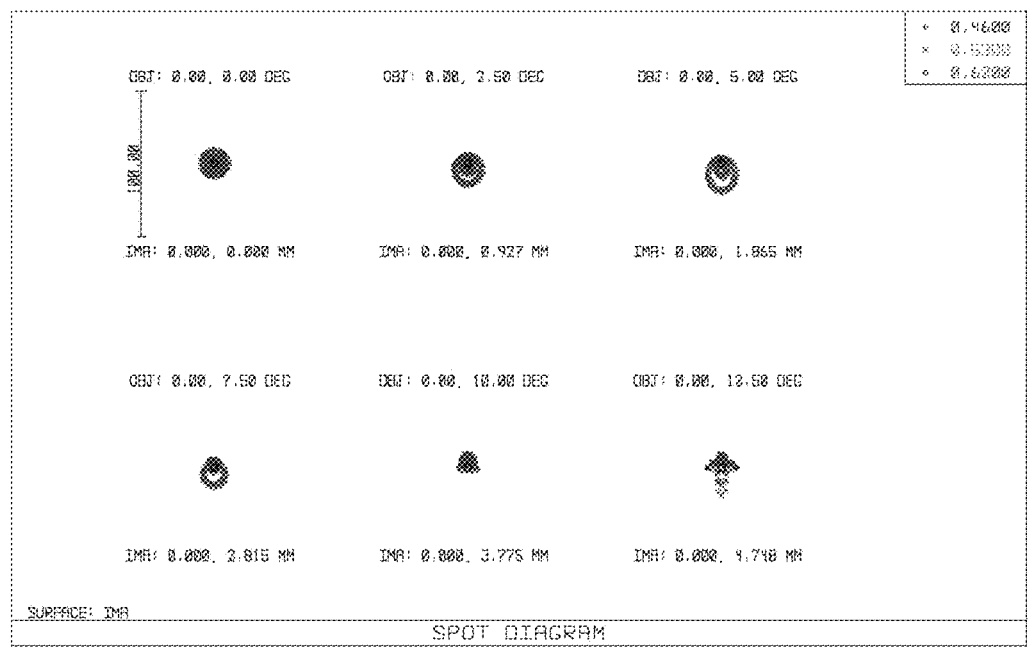
Fig.17
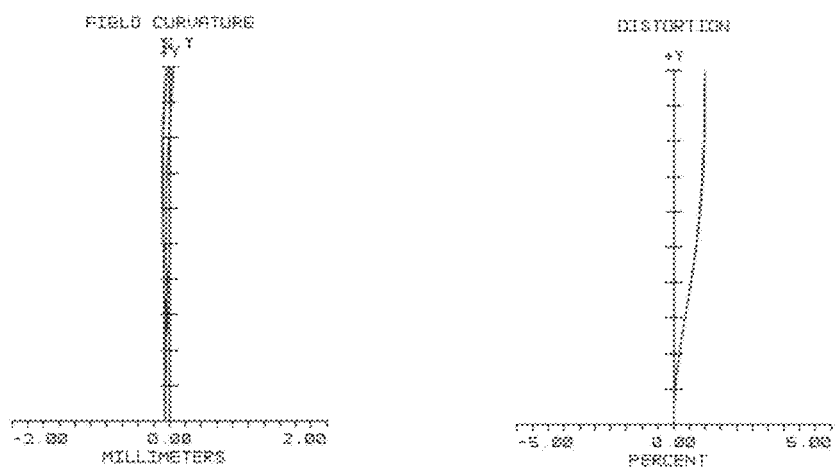
Fig.18a                    Fig.18b

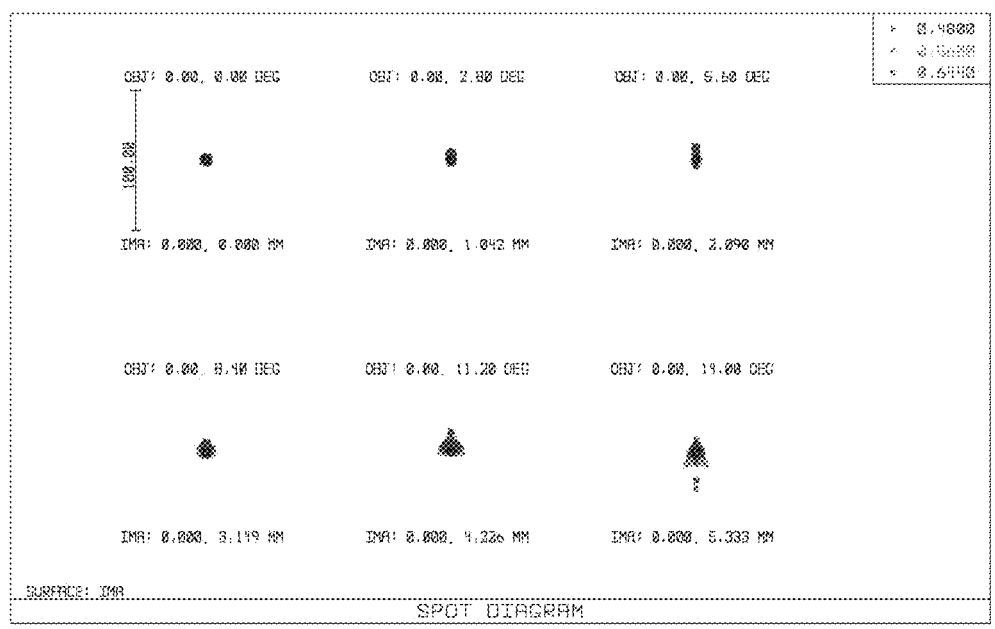
Fig.23
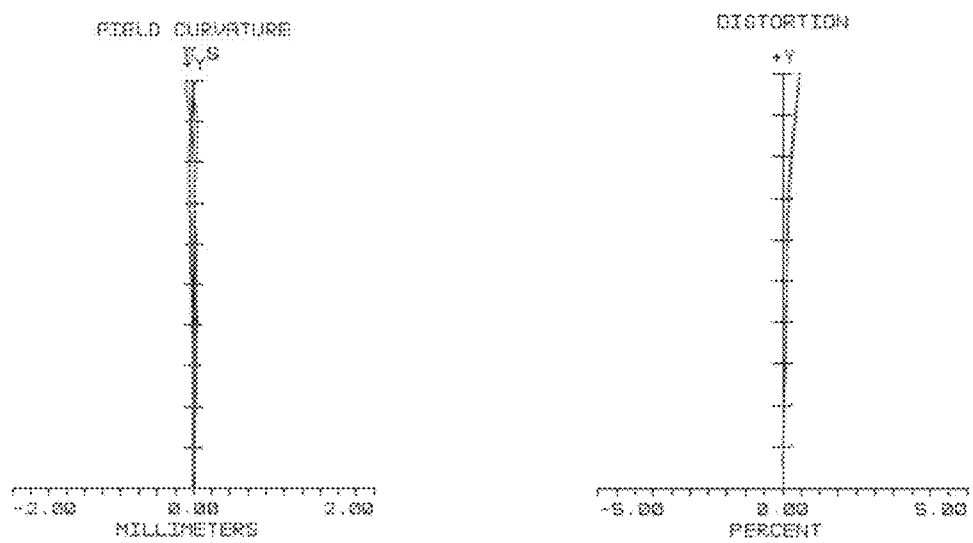
Fig.24a
Fig.24b

EYEPIECE OPTICAL SYSTEM FOR NEAR-EYE DISPLAY, AND HEAD-MOUNTED DISPLAY DEVICE

TECHNICAL FIELD

The present disclosure relates generally to the technical field of optical technology, and more particularly, to an eyepiece optical system for near-eye display and a head-mounted display device.

BACKGROUND

The head-mounted display device directs the video image light emitted from the miniature image displayer (e.g., a transmissive or reflective liquid crystal displayer, an organic electroluminescent element, or a DMD element) to the pupil of the user by optical technology to implement virtual magnified images in the near-eye range of the user, so as to provide the user with intuitive, visual images, video, text information, which can be applied to outdoor, simulated driving, training, presentation, teaching, training, medical treatment, flight and other scenes.

The eyepiece optical system is the core of the head-mounted display device, which realizes the function of displaying a miniature image in front of human eyes to form a virtual magnified image. The design of the eyepiece optical system directly affects the key factors such as the volume, the visual experience and so on of the head-mounted display device, especially for the optical system applied in an optical non-perspective head-mounted display device, which requires to achieve a large field-of-view in a small size, a high optical resolution for seeing enough picture details, while obtaining long-term viewing without causing visual fatigue. However, in the related art of the conventional head-mounted display device which has been disclosed so far, no optical system suitable for use in an optical non-perspective head-mounted display device has been found.

U.S. Pat. No. 7,180,675B2 has disclosed an optical system of a viewfinder which is composed of two groups of positive and negative optical elements and refraction and reflection apparatuses. However, this optical system just obtains a display effect with a field-of-view of about 18°, and a serious chromatism greater than 0.5 mm between C-line and F-line. Accordingly, such optical system cannot achieve a higher resolution of the optical display, so cannot be applied to the optical non-perspective head-mounted display device.

U.S. Pat. No. 8,531,774B2 has disclosed an optical system of a viewfinder which is composed of two positive lenses, one negative lens and a reflection unit. As both positive and negative optical lenses are placed between the eyes of the observer and the reflection unit, this optical system can obtain a field-of-view of about 26°, however, it has short exit pupil position (<11 mm), and large size along the viewing direction. When such optical system is applied to the optical non-perspective head-mounted display device, the requirements of comfortable wearing cannot be satisfied. Meanwhile, the optical image aberration is large and it is too difficult to obtain an image quality realizing a high-resolution optical effect. Accordingly, such optical system is not benefit for long-term comfort visual experience.

SUMMARY

The object of the present application is to provide an eyepiece optical system for near-eye display and a head-mounted display device, aiming at the above defects of the prior art.

In one aspect, an eyepiece optical system for near-eye display is provided for solving above technical problem, which comprising:

a first lens, a reflection unit, a second lens, and a third lens group arranged coaxially and successively along an optical axis direction from an eye viewing side to a miniature image displayer side, wherein an optical axis of the second lens and an optical axis of the third lens group are coaxially with each other and perpendicular to the miniature image displayer, wherein the optical axis of the second lens and the optical axis of the third lens group are coaxially with an optical axis of the first lens when they are reflected by the reflection unit, wherein the third lens group at least comprises a third lens;

wherein the second lens and the third lens have optical aspheric face shapes, and the first lens is the only one lens arranged between the reflection unit and the eye viewing side; wherein an effective focal length $f_{11}$ of the first lens, an effective focal length $f_{21}$ of the second lens, an effective focal length $f_{31}$ of the third lens, and an effective focal length $f_w$ of the eyepiece optical system satisfy following relations (1), (2) and (3), respectively:

$$0.75 < f_{11}/f_w < 4.5 \quad (1):$$

$$f_{21}/f_w < -0.28 \quad (2):$$

$$0.33 < f_{31}/f_w < 0.83 \quad (3):$$

wherein an optical surface of the second lens proximate to the miniature image displayer side is concave to a miniature image displayer direction, an optical surface of the first lens proximate to the eye viewing side is convex to an eye viewing direction, wherein the third lens is a biconvex lens;

wherein the third lens group further comprises a fourth lens proximate to the miniature image displayer;

wherein an effective focal length $f_{32}$ of the fourth lens, and the effective focal length $f_w$ of the eyepiece optical system satisfy following relation (4):

$$|f_{32}/f_w| > 0.45 \quad (4).$$

In the eyepiece optical system according to the present application, wherein the third lens group is composed of two optical lenses, wherein a lens proximate to the miniature image displayer is the fourth lens.

In the eyepiece optical system according to the present application, wherein the first lens is an aspheric lens.

In the eyepiece optical system according to the present application, wherein the reflection unit is a sheet having a reflection function comprising a base layer of glass, plastic or other inorganic materials and a reflective coating layer.

In the eyepiece optical system according to the present application, wherein the reflection unit is an optical prism.

In the eyepiece optical system according to the present application, wherein an optical surface of the first lens proximate to a reflection unit side is a plane.

In the eyepiece optical system according to the present application, wherein an optical surface of the second lens proximate to a reflection unit side is a plane.

In the eyepiece optical system according to the present application, wherein an optical surface of the fourth lens proximate to the miniature image displayer is concave to the miniature image displayer.

In the eyepiece optical system according to the present application, wherein an optical plane of the first lens is cemented with a neighbor plane of the optical prism, or an optical plane of the second lens is cemented with a neighbor plane of the optical prism, or each two of the first lens, the second lens and the optical prism are cemented with each other.

In the eyepiece optical system according to the present application, wherein a turning angle θ of the reflection unit relative to an optical axis of the eyepiece optical system satisfies following relation (6):

$$\theta = 90° \quad (6).$$

In the eyepiece optical system according to the present application, wherein the effective focal length $f_{11}$ of the first lens further satisfies following relation (7):

$$1.05 < f_{11}/f_w < 2.68 \quad (7).$$

In the eyepiece optical system according to the present application, wherein the effective focal length $f_{21}$ of the second lens, the effective focal length $f_{31}$ of the third lens, and the effective focal length $f_{32}$ of the fourth lens further satisfy following relations (8), (9) and (5):

$$f_{21}/f_w < -0.38 \quad (8);$$

$$0.41 < f_{31}/f_w < 0.58 \quad (9);$$

$$|f_{32}/f_w| > 0.86 \quad (5).$$

In the eyepiece optical system according to the present application, wherein the first lens, the second lens and the third lens are made of glass materials or plastic materials.

In the eyepiece optical system according to the present application, wherein a PBS prism or a sheet-type PBS is arranged along the optical axis direction between the third lens group and the miniature image displayer.

In another aspect, a head-mounted display device is provided, which comprising a miniature image display unit and an eyepiece located between the miniature image display unit and human eyes, wherein the eyepiece is any one of the eyepiece optical system discussed above.

In the head-mounted display device according to the present application, wherein the miniature image displayer is an organic electroluminescent light emitting element, a transmissive liquid crystal display element or a reflective liquid crystal display element.

In the head-mounted display device according to the present application, wherein a diopter of which is adjusted by adjusting a distance between the miniature image displayer and the eyepiece optical system along an optical axis direction.

In the head-mounted display device according to the present application, wherein the head-mounted display device is a double-eye head-mounted display device comprising same two of the eyepiece optical systems discussed above.

Following technical effects can be obtained by the present application. The eyepiece optical system has advantages such as compact structure, small size, high optical resolution and so on, and its exit pupil diameter is larger than that of the common eyepiece. The present eyepiece optical system can adopt spherical lens and aspherical lens collocation, optical plastic and glass combination, thus eliminating the system aberration significantly while reducing the manufacturing costs and product weight, especially obtaining optical indices such as low distortion, smaller chromatism, field curvature and astigmatism, and so on at the same time. Such that the observer can watch large images of full frame, high definition and uniform image quality without any distortion and get visual experience of high liveness via the eyepiece optical system according to the present application.

BRIEF DESCRIPTION OF THE DRAWINGS

In order to more clearly illustrate the embodiments of the present application or the technical solutions in the prior art, the present application is further illustrated combining the embodiments and drawings attached. The drawings in the following description are only some embodiments of the present application. For one skilled in the art, other drawings may be obtained from these drawings without any inventive work.

FIG. 5 is a spot diagram of the eyepiece optical system according to the second embodiment of the present application.

FIG. 6a is a field curve diagram of the eyepiece optical system according to the second embodiment of the present application.

FIG. 6b is a distortion curve diagram of the eyepiece optical system according to the second embodiment of the present application.

FIG. 17 is a spot diagram of the eyepiece optical system according to the sixth embodiment of the present application.

FIG. 18a is a field curve diagram of the eyepiece optical system according to the sixth embodiment of the present application.

FIG. 18b is a distortion curve diagram of the eyepiece optical system according to the sixth embodiment of the present application.

FIG. 23 is a spot diagram of the eyepiece optical system according to the eighth embodiment of the present application.

FIG. 24a is a field curve diagram of the eyepiece optical system according to the eighth embodiment of the present application.

FIG. 24b is a distortion curve diagram of the eyepiece optical system according to the eighth embodiment of the present application.

DETAILED DESCRIPTION OF THE PREFERRED EMBODIMENT

Figure 1:
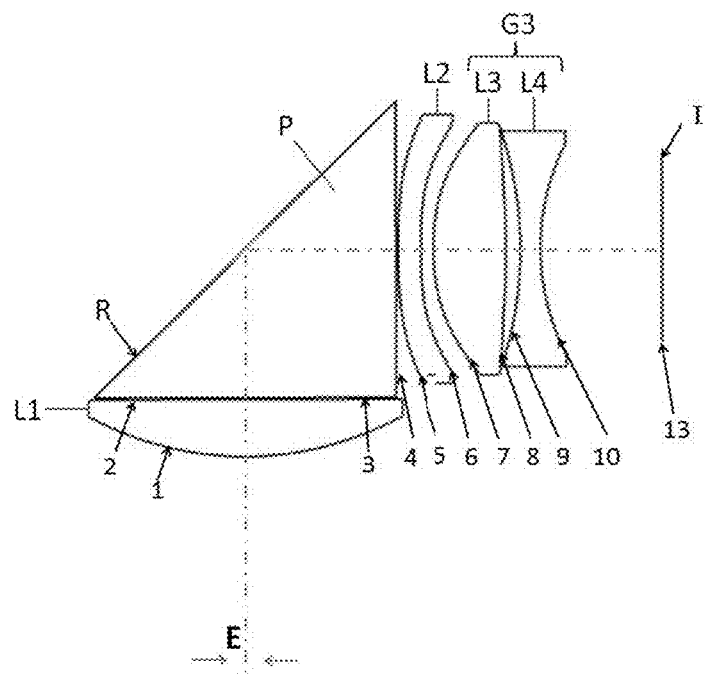
FIG. 1 is an optical path diagram of the eyepiece optical system according to a first embodiment of the present application.

In order to clarify the objects, technical solutions and advantages of the embodiments of the present application, the following detailed description will be made for the technical solution in the embodiments of the present application. Apparently, the described embodiments are just some rather than all embodiments of the present application. All other embodiments obtained by one skilled in the art without any inventive work based on the embodiments disclosed in the application fall into the scope of the present application.

The eyepiece optical system for near-eye display according to the present application comprises a first lens, a reflection unit, a second lens, and a third lens group arranged coaxially and successively along an optical axis direction from an eye viewing side to a miniature image displayer side. An optical axis of the second lens and an optical axis of the third lens group are coaxially with each other and perpendicular to the miniature image displayer. The optical axis of the second lens and the optical axis of the third lens group are coaxially with an optical axis of the first lens when the optical axis of the second lens and the optical axis of the third lens group are reflected by the reflection unit. The third lens group at least comprises a third lens. The second lens and the third lens have optical aspheric face shapes, and the first lens is the only one lens arranged between the reflection unit and the eye viewing side. An effective focal length $f_{11}$ of the first lens and an effective focal length $f_w$ of the eyepiece optical system satisfy following relations (1):

$$0.75 < f_{11}/f_w < 4.5 \qquad (1).$$

Among others, the value of $f_{11}/f_w$ can be 0.75, 4.50, 1.05, 2.66, 1.21, 1.35, 0.87, 1.39, 1.47, 1.21, 1.54, 1.45, 1.88, 1.29, 1.25, 1.20, 1.14, 1.21, 1.15, 1.17, 1.25, 1.13 and 1.67.

Furthermore, an effective focal length $f_{21}$ of the second lens, an effective focal length $f_{31}$ of the third lens, and an effective focal length $f_w$ of the eyepiece optical system satisfy following relations (2) and (3), respectively:

$$f_{21}/f_w < -0.28 \qquad (2);$$

$$0.33 < f_{31}/f_w < 0.83 \qquad (3).$$

Among others, the value of $f_{21}/f_w$ can be −0.28, −0.93, −0.49, −0.59, −397.60, −0.72, −0.38, −0.69, −0.58, 8.00, −0.45, −0.76, −2.42, −0.61, −0.67, −0.69 and −0.57 ; while the value of $f_{31}/f_w$ can be 0.39, 0.47, 0.55, 0.45, 0.50, 0.46, 0.40, 0.53, 0.97, 0.48, 0.53 and 0.57.

The value ranges of $f_{21}/f_w$ and $f_{31}/f_w$ in the relations (2) and (3) are closely related to the system aberration correction, the processing difficulty and the assembly deviation sensitivity of the optical elements, which corrects the system aberration adequately to obtain an optical effect of high quality and improve the machinability of the optical elements in such system.

Furthermore, the third lens is composed of two optical lenses, which further comprises a fourth lens proximate to the miniature image displayer. The fourth lens can correct the field curvature and astigmatism better, which is beneficial to a larger field-of-view angle and higher optical resolution. An effective focal length $f_{32}$ of the fourth lens, and an effective focal length $f_w$ of the eyepiece optical system satisfy following relation (4):

$$|f_{32}/f_w| < 0.45 \qquad (4).$$

Among others, the value of $f_{32}/f_w$ can be 0.8, −3.79, 5.93, −0.45, −0.47, 0.55, 0.97, 2.90, −78.5, 0.86, −1.62, 0.9, 5.79, 14.93, −6.45, −1.47, 1.55, 1.97, 0.90, −0.5, −0.82 and −0.62.

The value rang of $f_{32}/f_w$ in the above relation is closely related to the system aberration correction, the processing difficulty and the assembly deviation sensitivity of the optical elements, which corrects the system aberration adequately to obtain an optical effect of high quality and improve the machinability of the optical elements in such system.

As shown in FIG. 1, a first lens L1, a reflection unit P, a second lens L2, a third lens L3 and a fourth lens L4 are arranged coaxially and successively along an optical axis direction from an eye viewing side to a miniature image displayer side. The optical surface closer to the diaphragm E side has a serial number of 1, and so on (the optical surface from left to right has a serial number of 2, 3, 4, 5, 6, 7, 8, 9 and 10, respectively). And the surface of the display device I has a serial number of 13. The reflection unit P has a reflection surface R. The light emitted from the miniature image displayer sequentially passes through the fourth lens, the third lens, the second lens, the reflection unit and the first lens, and then enters the human eyes.

In the above embodiment, since a single one lens having a focal length satisfying the above relation (1) is provided between the reflection unit and the eye viewing side, it is possible to not only reduce the overall size of the eyepiece optical system, but also achieve the maximum field-of-view angle in the same size. Furthermore, as the reflection unit is an optical prism, the lens can be cemented with or formed in one piece with the optical prism, which significantly reduces the difficulty of production assembly and the complexity of structural design.

At the same time, the system distortion is well corrected by using the second lens and the third lens having optical aspheric face shapes.

Compared with the patented technical solutions of U.S. Pat. No. 7,180,675B2 and U.S. Pat. No. 8,531,774B2, the eyepiece optical system of the above embodiment of the present application controls the system size in a great degree while increasing the effective field-of-view angle of the system through the combination of the first positive lens and the reflection unit, and further corrects the system aberration and realize an effective field-of-view angle of 24° to 30° through the matching design of the second lens and the third lens group, as well as the application of the optical aspheric face shapes. At the same time, the present eyepiece optical system has a chromatism which is smaller than 0.08 mm between C-line and F-line in the full frame range while achieving a compact system structure, and optical properties such as a large field-of-view angle, high optical resolution, low distortion and so on, so that it is benefit for long-term comfort visual experience.

Meanwhile, in the above embodiment, an optical surface of the second lens proximate to the miniature image displayer side is concave to a miniature image displayer direction, an optical surface of the first lens proximate to the eye viewing side is convex to an eye viewing direction, and an optical surface of the fourth lens proximate to the miniature image displayer is concave to the miniature image displayer. In such a way, the overall size of the eyepiece optical system is further reduced to achieve the maximum field-of-view angle in the same size. Furthermore, the system image quality is improved and the system aberrations such as astigmatism and field curvature are perfected, which are conducive to the eyepiece system to achieve a high resolution optical effect of uniform image quality in the full frame.

In a further eyepiece optical system embodiment, the first lens is an aspherical lens having an aspherical surface expression (a):

$$z = \frac{cr^2}{1+\sqrt{1-(1+k)c^2r^2}} + \alpha_2 r^2 + \alpha_4 r^4 + \alpha_6 r^6 + \ldots ; \quad (a)$$

wherein, z is the sagittal height of the optical plane; c is the curvature at top of the aspheric surface; k is the aspheric coefficient; α, 2,4,6 . . . are order coefficients, and r is the distance coordinate from the point on the surface to the optical axis of the lens system.

In the above embodiment of the eyepiece optical system, the reflection unit is an optical reflective film or a reflective mirror, which is capable of reducing the manufacturing cost and the total weight of the system.

In the above embodiment of the eyepiece optical system, the reflection unit employs an optical prism which may correct the aberration performance of the optical system better.

Preferably, in the above embodiment of the eyepiece optical system, an optical surface of the first lens proximate to the reflection unit side is a plane, and an optical surface of the second lens proximate to the reflection unit side is a plane.

Preferably, in the above embodiment of the eyepiece optical system, an optical plane of the first lens is cemented with a neighbor plane of the optical prism, or an optical plane of the second lens is cemented with a neighbor plane of the optical prism, or each two of the first lens, the second lens and the optical prism are cemented with each other.

In the above embodiment of the eyepiece optical system, a turning angle θ of the reflection unit relative to an optical axis of the eyepiece optical system can be any value in a range of 0–180° . Preferably, the turning angle θ of the reflection unit relative to the optical axis of the eyepiece optical system satisfies following relation (6):

$$\theta = 90° \quad (6).$$

Preferably, in the above embodiment of the eyepiece optical system, the effective focal length $f_{11}$ of the first lens further satisfies following relation (7):

$$1.05 < f_{11}/f_w < 2.68 \quad (7).$$

Among others, the value of $f_{11}/f_w$ can be 1.05, 1.22, 1.36, 0.89, 1.49, 1.47, 1.21, 1.54, 1.45, 1.88, 1.29, 1.25, 1.20, 1.14, 1.67, 2.10, 2.21, 2.32 and 2.68.

The value rang of $f_{11}/f_w$ in the relation (7) is closely related to the system aberration correction, the processing difficulty and the assembly deviation sensitivity of the optical elements, which corrects the system aberration adequately to obtain an optical effect of high quality and improve the machinability of the optical elements in such system.

Preferably, in the above embodiment of the eyepiece optical system, the effective focal length $f_{21}$ of the second lens, the effective focal length $f_{31}$ of the third lens, and the effective focal length $f_{32}$ of the fourth lens satisfy following relations (8), (9) and (5), respectively:

$$f_{21}/f_w < -0.38 \quad (8);$$

$$0.41 < f_{31}/f_w < 0.58 \quad (9);$$

$$|f_{32}/f_w| > 0.86 \quad (5).$$

Among others, the value of $f_{21}/f_w$ can be −0.93, −0.50, −0.59, −397.60, −0.72, −0.38, −0.58, −0.45, −0.76, −2.42, −0.62, −0.68 and −0.57; while the value of $f_{31}/f_w$ can be 0.47, 0.55, 0.41, 0.50, 0.46, 0.53, 0.48 and 0.57; and the value of $f_{32}/f_w$ can be −3.79, 5.93, 0.97, 2.90, −78.5, 0.86, −1.62, 0.9, 5.79, 14.93, −6.45, −1.47, 1.55, 1.97, 0.90 and −0.82.

The value ranges of $f_{21}/f_w$, $f_{31}/f_w$ and $f_{32}/f_w$ in the relations (8), (9) and (5) are closely related to the system aberration correction, the processing difficulty and the assembly deviation sensitivity of the optical elements, which corrects the system aberration adequately to obtain an optical effect of high quality and improve the machinability of the optical elements in such system.

Preferably, in the above embodiment of the eyepiece optical system, the first lens, the second lens and the third lens are made of glass materials or plastic materials.

In a further embodiment, when the miniature image displayer uses a liquid crystal on silicon (LCOS) displayer, and a polarization beam splitter (PBS) prism, or a sheet-type PBS is arranged along the optical axis direction between the third lens group and the miniature image displayer for providing illumination to the LCOS displayer in conjunction with LED light sources.

The present application will now be further described with reference to the accompanying drawings and specific embodiments. In the optical path diagrams of the following embodiments, the light emitted from the miniature image displayer sequentially passes through the fourth lens, the third lens, the second lens, the reflection unit and the first lens, and then enters the human eyes. The diaphragm E can be the exit pupil of imaging for the eyepiece optical system.

It is a virtual aperture. The best imaging effect can be observed when the pupil of the human eye is positioned at the diaphragm location. The spot diagrams provided by the following embodiments reflecting the geometric structure of the optical imaging system, can be represented by dispersion spots formed by the section of the specified wavelength light focused on the image plane in the specified field, while ignoring the diffraction effect, and meanwhile, it can comprise multiple field-of-views and lights of multiple wavelengths. Therefore, the imaging quality of the optical system can be evaluated intuitively through the intensive degree, the shape and size of the dispersion spots in the spot diagram, while the chromatism of the optical system can also be evaluated intuitively through the misalignment degree of the dispersion spots with different wavelengths in the spot diagram. The smaller the root-mean-square radius (RMS) of the spot diagram, the higher the imaging quality of the optical system.

Embodiment 1

As shown in FIG. 1, in the schematic diagram showing the optical path of the eyepiece optical system, a first lens L1, a reflective mirror or a reflective film (that is, a reflection unit), a second lens L2, a third lens L3 and a fourth lens L4 are arranged coaxially and successively along an optical axis direction from an eye viewing side to a miniature image displayer side. The optical surface closer to the diaphragm E side has a serial number of 1, and so on (the optical surface from left to right has a serial number of 2, 3, 4, 5, 6, 7, 8, 9 and 10, respectively). And the surface of the display device I has a serial number of 13. The reflection unit has a reflection surface R. The first lens L1 is a flat convex positive lens, the second lens L2 is a crescent negative lens, the third lens L3 is a biconvex positive lens, and the fourth lens is a biconcave negative lens. The present embodiment can sufficiently correct the system aberration, such as the distortion, field curvature and chromatism, and provide sufficient positive focal power with a viewing angle of 29° while guaranteeing a small volume.

Figure 2:
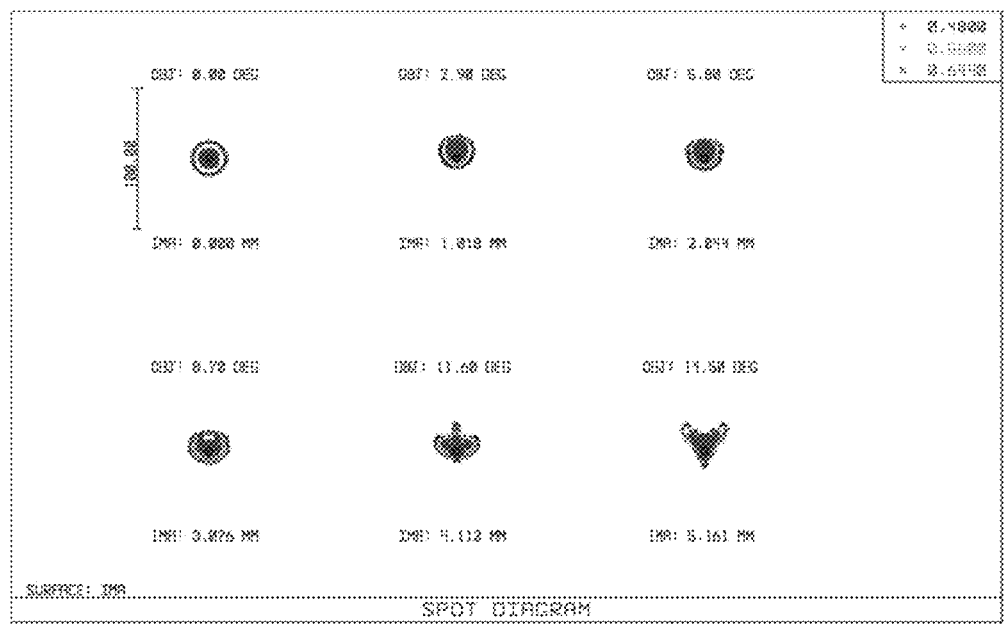
FIG. 2 is a spot diagram of the eyepiece optical system according to the first embodiment of the present application.

FIG. 2 has shown the spot diagram of the eyepiece optical system according to the Embodiment 1 of the present application. As shown, the lights of different field-of-views in the present embodiment have dispersion spots of small and uniform radii on the image plane (display device I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

Figure 3A:
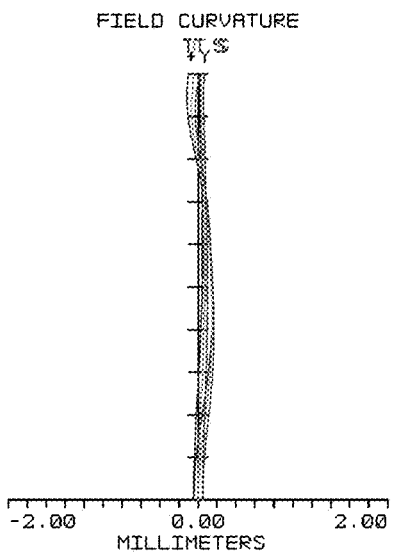
FIG. 3a is a field curve diagram of the eyepiece optical system according to the first embodiment of the present application.
Figure 3B:
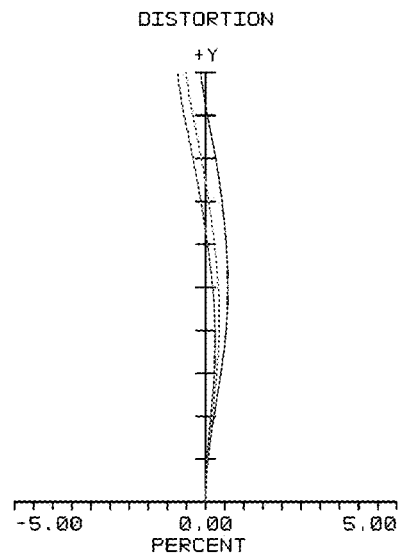
FIG. 3b is a distortion curve diagram of the eyepiece optical system according to the first embodiment of the present application.

FIG. 3a and FIG. 3b have respectively shown the field curvature and distortion curve of the eyepiece optical system according to the Embodiment 1 of the present application, by which the characteristics of the present optical system such as super large field-of-view and high imaging quality and so on, have been represented.

Embodiment 2

Figure 4:
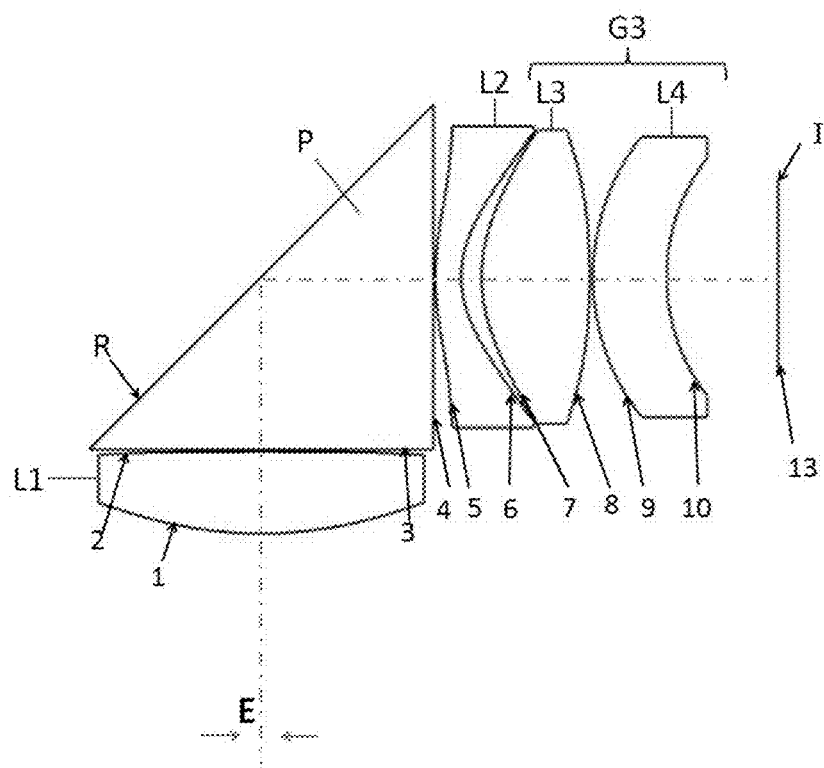
FIG. 4 is an optical path diagram of the eyepiece optical system according to a second embodiment of the present application.

As shown in FIG. 4, in the schematic diagram showing the optical path of the eyepiece optical system, a first lens L1, a prism P (that is, a reflection unit), a second lens L2, a third lens L3 and a fourth lens L4 are arranged coaxially and successively along an optical axis direction from an eye viewing side to a miniature image displayer side. The optical surface closer to the diaphragm E side has a serial number of 1, and so on (the optical surface from left to right has a serial number of 2, 3, 4, 5, 6, 7, 8, 9 and 10, respectively). And the surface of the display device I has a serial number of 13. The reflection unit has a reflection surface R. The first lens L1 is a biconvex positive lens, the second lens L2 is a crescent negative lens, the third lens L3 is a biconvex positive lens, and the fourth lens is a crescent negative lens. The present embodiment can sufficiently correct the system aberration, such as the distortion, field curvature and chromatism, and provide sufficient positive focal power with a viewing angle of 28° while guaranteeing a small volume.

TABLE 1

Optical system parameters list of Embodiment 1
Embodiment 1: effective focal length 20.1 mm, field-of-view angle 2ω = 29°

| Serial number of Surfaces | Curvature radius (mm) | Thickness (mm) | Refractive index | Abbe number | Diameter (mm) | Aspheric coefficient |
| --- | --- | --- | --- | --- | --- | --- |
| OBJ | Infinite | Infinite | | | | |
| 1 | 15.39 | 2.8 | 1.63 | 63.8 | 16 | 1.76 |
| 2 | Infinite | 0.1 | | | 16 | 0.00 |
| 3 | Infinite | 14.6 | 1.85 | 23.8 | 16 | 0 |
| 4 | Infinite | 0.1 | | | 16 | 0 |
| 5 | 39.25 | 1.1 | 1.65 | 21.7 | 14 | 21.49 |
| 6 | 38.53 | 0.6 | | | 14 | 22.90 |
| 7 | 12.56 | 3.5 | 1.77 | 50 | 13 | −1.11 |
| 8 | −33.89 | 0.7 | | | 13 | −28.26 |
| 9 | −18.76 | 1 | 1.78 | 25.7 | 12 | 0 |
| 10 | 11.65 | 5.9 | | | 12 | 0 |
| 13 Display device | Infinite | | | | | |

TABLE 2

Optical system parameters list of Embodiment 2
Embodiment 2: effective focal length 20.2 mm, field-of-view angle 2ω = 28°

| Serial number of Surfaces | Curvature radius (mm) | Thickness (mm) | Refractive index | Abbe number | Diameter (mm) | Aspheric coefficient |
|---|---|---|---|---|---|---|
| OBJ | Infinite | Infinite | | | | |
| 1 | 19.08 | 3.8 | 1.69 | 53.2 | 16 | 2.73 |
| 2 | −334.89 | 0.1 | | | 16 | 1618.98 |
| 3 | Infinite | 16.0 | 1.78 | 25.7 | 16 | 0 |
| 4 | Infinite | 0.1 | | | 16 | 0 |
| 5 | 12.46 | 1.2 | 1.63 | 23.3 | 15 | 0.38 |
| 6 | 4.62 | 1.0 | | | 15 | −0.87 |
| 7 | 6.96 | 5.0 | 1.53 | 55.7 | 14 | −3.20 |
| 8 | −30.06 | 0.2 | | | 14 | 0.46 |
| 9 | 10.50 | 3.4 | 1.70 | 30.1 | 13 | 0 |
| 10 | 9 | 5.2 | | | 13 | 0 |
| 13 Display device | Infinite | | | | | |

FIG. 5 has shown the spot diagram of the eyepiece optical system according to the Embodiment 2 of the present application. As shown, the lights of different field-of-views in the present embodiment have dispersion spots of small and uniform radii on the image plane (display device I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

FIG. 6a and FIG. 6b have respectively shown the field curvature and distortion curve of the eyepiece optical system according to the Embodiment 2 of the present application, by which the characteristics of the present optical system such as super large field-of-view and high imaging quality and so on, have been represented.

Embodiment 3

Figure 7:
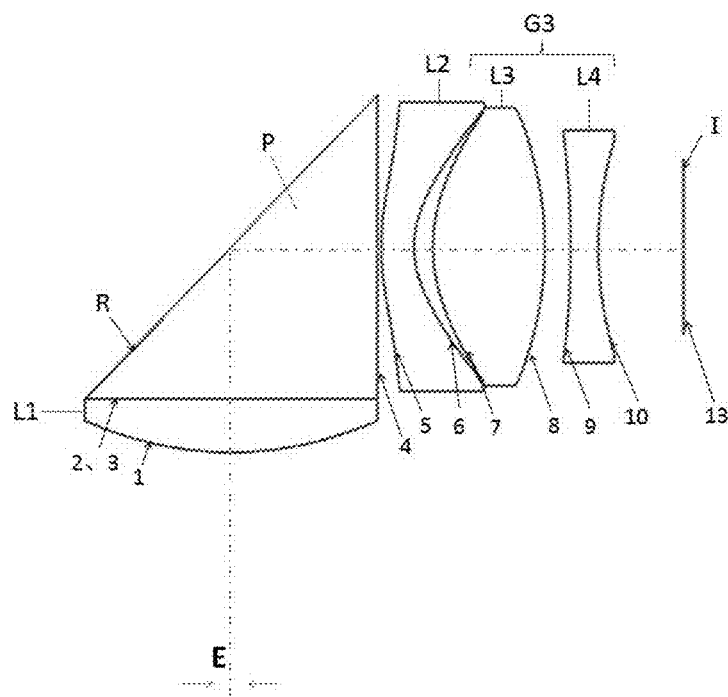
FIG. 7 is an optical path diagram of the eyepiece optical system according to a third embodiment of the present application.

As shown in FIG. 7, in the schematic diagram showing the optical path of the eyepiece optical system, a first lens L1, a prism P, a second lens L2, a third lens L3 and a fourth lens L4 are arranged coaxially and successively along an optical axis direction from an eye viewing side to a miniature image displayer side. The optical surface closer to the diaphragm E side has a serial number of 1, and so on (the optical surface from left to right has a serial number of 2, 3, 4, 5, 6, 7, 8, 9 and 10, respectively). And the surface of the display device I has a serial number of 13. The reflection unit has a reflection surface R. The first lens L1 is a flat convex positive lens, the second lens L2 is a crescent negative lens, the third lens L3 is a biconvex positive lens, and the fourth lens is a biconcave negative lens, wherein the first lens and the reflection unit are cemented with each other. The present embodiment can sufficiently correct the system aberration, such as the distortion, field curvature and chromatism, and provide sufficient positive focal power with a viewing angle of 29° while guaranteeing a small volume.

TABLE 3

Optical system parameters list of Embodiment 3
Embodiment 3: effective focal length 19.9 mm, field-of-view angle 2ω = 29°

| Serial number of Surfaces | Curvature radius (mm) | Thickness (mm) | Refractive index | Abbe number | Diameter (mm) | Aspheric coefficient |
|---|---|---|---|---|---|---|
| OBJ | Infinite | Infinite | | | | |
| 1 | 19.24 | 2.8 | 1.69 | 53.2 | 16 | 1.89 |
| 2 | Infinite | 0.1 | | | 16 | 0.00 |
| 3 | Infinite | 16 | 1.81 | 25.5 | 16 | 0 |
| 4 | Infinite | 0.1 | | | 16 | 0 |
| 5 | 12.16 | 1.8 | 1.63 | 23.3 | 15 | 1.13 |
| 6 | 4.81 | 1 | | | 15 | −0.67 |
| 7 | 7.98 | 6.1 | 1.74 | 49.3 | 15 | −3.51 |
| 8 | −17.54 | 1.4 | | | 15 | −4.71 |
| 9 | −44.39 | 1.5 | 1.69 | 31.2 | 12 | 0 |
| 10 | 18.16 | 4.7 | | | 12 | 0 |
| 13 Display device | Infinite | | | | | |

Figure 8:
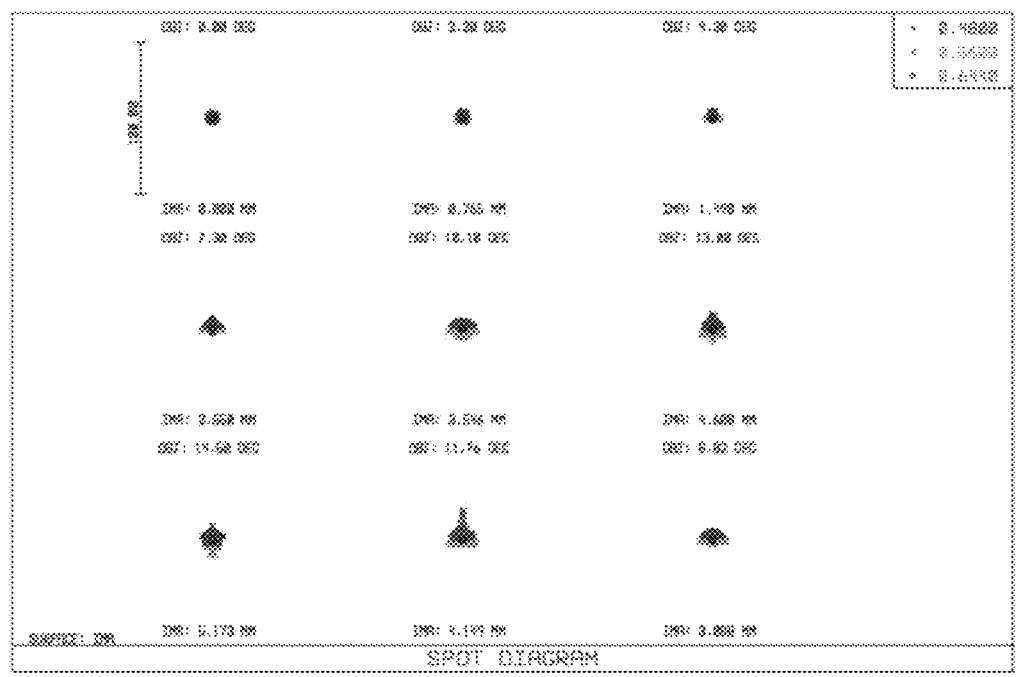
FIG. 8 is a spot diagram of the eyepiece optical system according to the third embodiment of the present application.

FIG. 8 has shown the spot diagram of the eyepiece optical system according to the present embodiment of the present application. As shown, the lights of different field-of-views in the present embodiment have dispersion spots of small and uniform radii on the image plane (display device I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

Figure 9A:
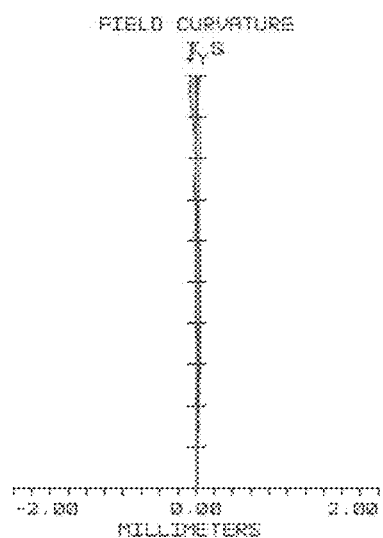
FIG. 9a is a field curve diagram of the eyepiece optical system according to the third embodiment of the present application.
Figure 9B:
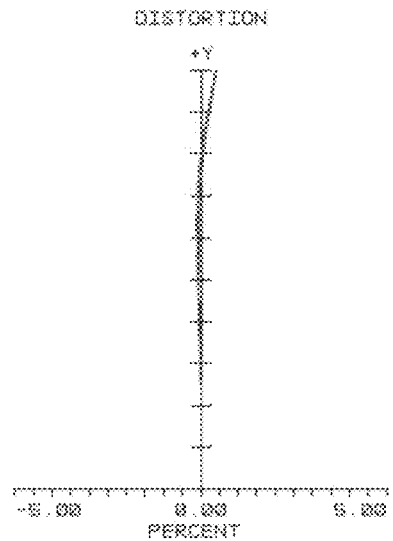
FIG. 9b is a distortion curve diagram of the eyepiece optical system according to the third embodiment of the present application.

FIG. 9a and FIG. 9b have respectively shown the field curvature and distortion curve of the eyepiece optical system according to the present embodiment of the present application, by which the characteristics of the present optical system such as super large field-of-view and high imaging quality and so on, have been represented.

Embodiment 4

Figure 10:
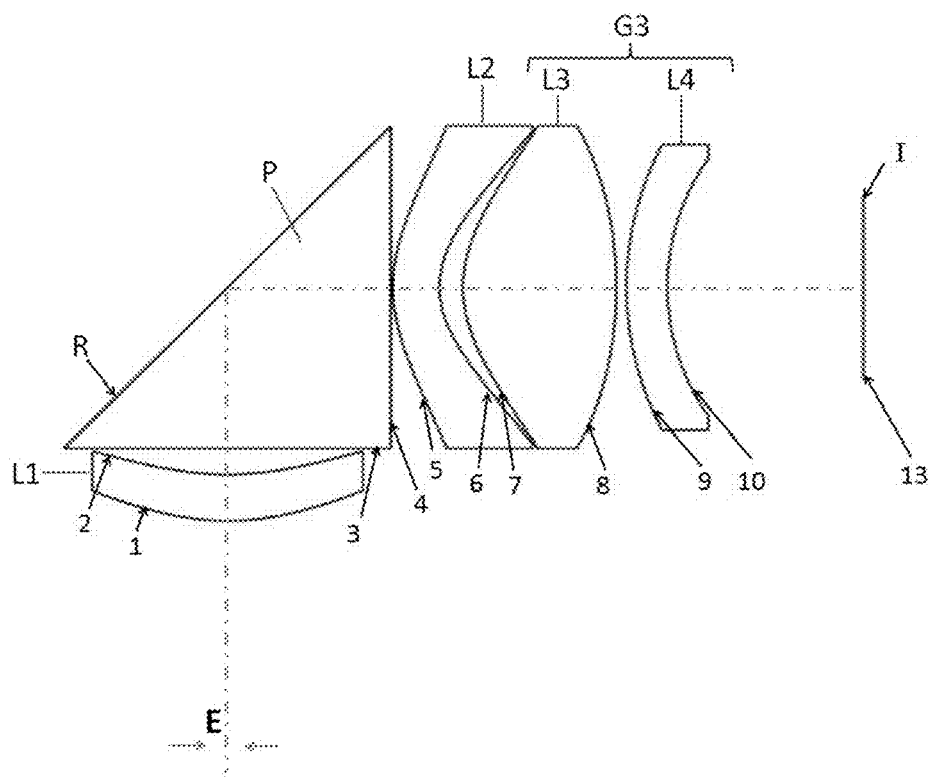
FIG. 10 is an optical path diagram of the eyepiece optical system according to a fourth embodiment of the present application.

As shown in FIG. 10, in the schematic diagram showing the optical path of the eyepiece optical system, a first lens L1, a prism P, a second lens L2, a third lens L3 and a fourth lens L4 are arranged coaxially and successively along an optical axis direction from an eye viewing side to a miniature image displayer side. The optical surface closer to the diaphragm E side has a serial number of 1, and so on (the optical surface from left to right has a serial number of 2, 3, 4, 5, 6, 7, 8, 9 and 10, respectively). And the surface of the display device I has a serial number of 13. The reflection unit has a reflection surface R. The first lens L1 is a crescent positive lens, the second lens L2 is a crescent negative lens, the third lens L3 is a biconvex positive lens, and the fourth lens is a crescent negative lens. The present embodiment can sufficiently correct the system aberration, such as the distortion, field curvature and chromatism, and provide sufficient positive focal power with a viewing angle of 27° while guaranteeing a small volume.

TABLE 4

Optical system parameters list of Embodiment 4
Embodiment 4: effective focal length 21.1 mm, field-of-view angle 2ω = 27°

| Serial number of Surfaces | Curvature radius (mm) | Thickness (mm) | Refractive index | Abbe number | Diameter (mm) | Aspheric coefficient |
|---|---|---|---|---|---|---|
| OBJ | Infinite | Infinite | | | | |
| 1 | 12.03 | 2.3 | 1.68 | 55.2 | 15 | −1.80 |
| 2 | 13.64 | 1.3 | | | 15 | −9.77 |
| 3 | Infinite | 16 | 1.81 | 25.5 | 16 | 0 |
| 4 | Infinite | 0.1 | | | 16 | 0 |
| 5 | 8.07 | 2.3 | 1.63 | 23.3 | 17 | −0.27 |
| 6 | 4.35 | 1.2 | | | 17 | −0.83 |
| 7 | 6.12 | 7.5 | 1.53 | 55.7 | 17 | −2.59 |
| 8 | −20.2 | 0.5 | | | 17 | −8.33 |
| 9 | 15.22 | 2 | 1.69 | 31.2 | 15 | 0 |
| 10 | 11.22 | 9.6 | | | 15 | 0 |
| 13 Display device | Infinite | | | | | |

Figure 11:
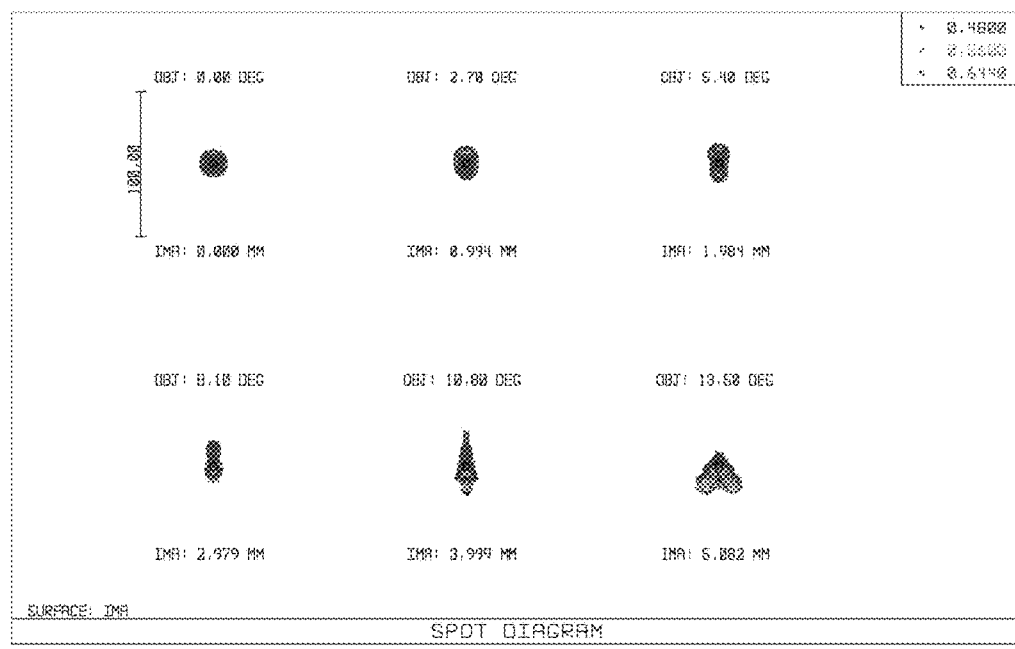
FIG. 11 is a spot diagram of the eyepiece optical system according to the fourth embodiment of the present application.

FIG. 11 has shown the spot diagram of the eyepiece optical system according to the present embodiment of the present application. As shown, the lights of different field-of-views in the present embodiment have dispersion spots of small and uniform radii on the image plane (display device I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

Figures 12A, 12B:
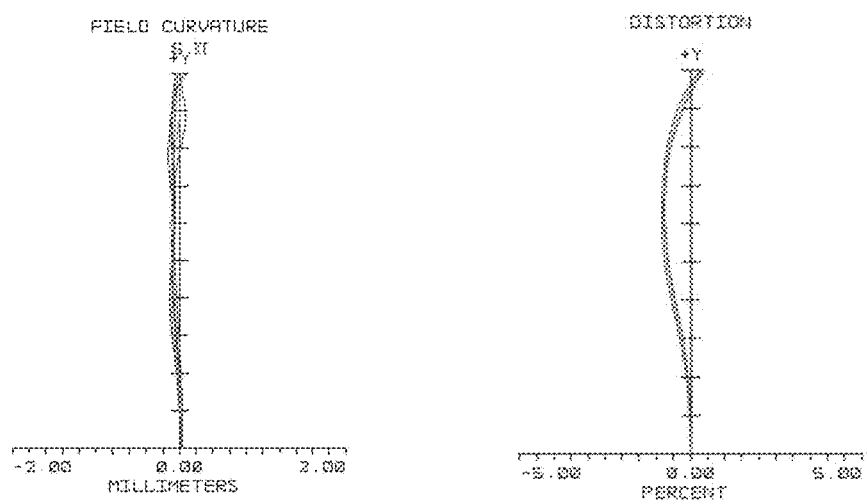
FIG. 12a is a field curve diagram of the eyepiece optical system according to the fourth embodiment of the present application.
FIG. 12b is a distortion curve diagram of the eyepiece optical system according to the fourth embodiment of the present application.

FIG. 12a and FIG. 12b have respectively shown the field curvature and distortion curve of the eyepiece optical system according to the present embodiment of the present application, by which the characteristics of the present optical system such as super large field-of-view and high imaging quality and so on, have been represented.

Embodiment 5

Figure 13:
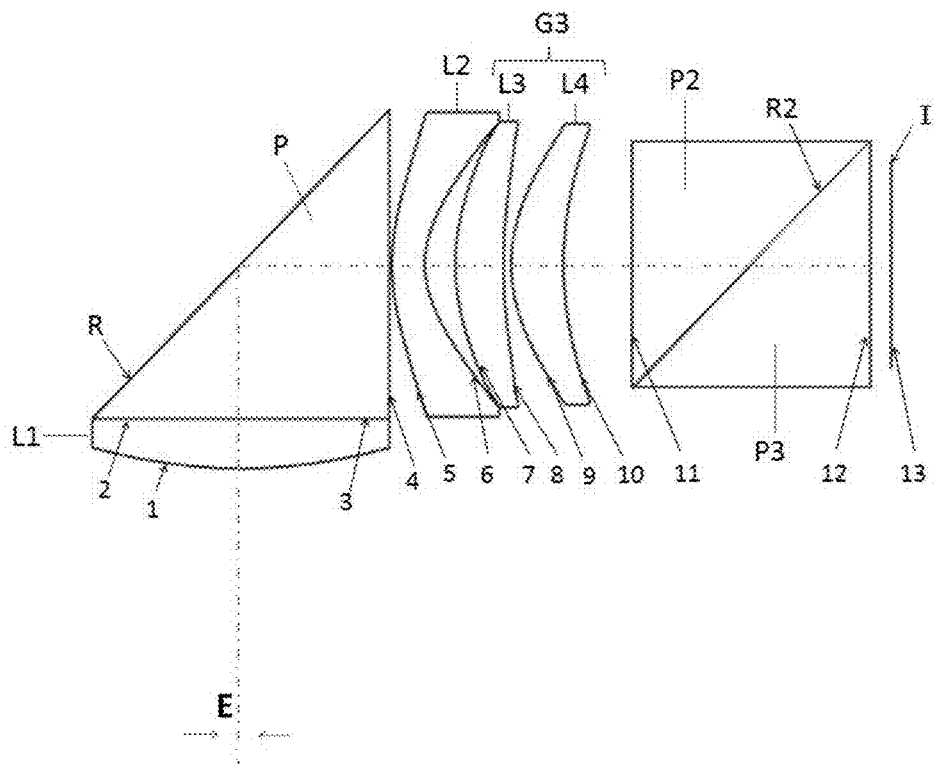
FIG. 13 is an optical path diagram of the eyepiece optical system according to a fifth embodiment of the present application.

As shown in FIG. 13, in the schematic diagram showing the optical path of the eyepiece optical system, a first lens L1, a prism P, a second lens L2, a third lens L3 and a fourth lens L4 are arranged coaxially and successively along an optical axis direction from an eye viewing side to a miniature image displayer side. The optical surface closer to the diaphragm E side has a serial number of 1, and so on (the optical surface from left to right has a serial number of 2, 3, 4, 5, 6, 7, 8, 9 and 10, respectively). And the surface of the display device I has a serial number of 13. The reflection unit has a reflection surface R. The first lens L1 is a flat convex positive lens, the second lens L2 is a crescent negative lens, the third lens L3 is a crescent positive lens, and the fourth lens is a crescent positive lens. A PBS prism group including a first PBS prism P2 and a second PBS prism P3 cemented together is provided between the fourth lens L4 and the miniature image displayer. The PBS prism group has a reflection surface R2 which can be used for illuminate the miniature image displayer. The present embodiment can sufficiently correct the system aberration, such as the distortion, field curvature and chromatism, and provide sufficient positive focal power with a viewing angle of 24° while guaranteeing a small volume.

TABLE 5

Optical system parameters list of Embodiment 5
Embodiment 5: effective focal length 20.6 mm, field-of-view angle 2ω = 24°

| Serial number of Surfaces | Curvature radius (mm) | Thickness (mm) | Refractive index | Abbe number | Diameter (mm) | Aspheric coefficient |
|---|---|---|---|---|---|---|
| OBJ | Infinite | Infinite | | | | |
| 1 | 22.48 | 2.1 | 1.74 | 49.3 | 13 | −12.28 |
| 2 | Infinite | 0.1 | | | 13 | 0.00 |
| 3 | Infinite | 13 | 1.85 | 23.8 | 13 | 0 |
| 4 | Infinite | 0.1 | | | 13 | 0 |
| 5 | 8.85 | 1.4 | 1.64 | 24.0 | 13 | −2.89 |
| 6 | 3.84 | 1.3 | | | 13 | −1.58 |

TABLE 5-continued

Optical system parameters list of Embodiment 5
Embodiment 5: effective focal length 20.6 mm, field-of-view angle 2ω = 24°

| Serial number of Surfaces | Curvature radius (mm) | Thickness (mm) | Refractive index | Abbe number | Diameter (mm) | Aspheric coefficient |
|---|---|---|---|---|---|---|
| 7 | 8.50 | 2.1 | 1.77 | 49.6 | 12 | −1.31 |
| 8 | 21.09 | 0.3 | | | 12 | 1.20 |
| 9 | 6.39 | 2.3 | 1.53 | 56.0 | 12 | −0.60 |
| 10 | 14.07 | 3 | | | 12 | −1.73 |
| 11 | Infinite | 10.4 | 1.52 | 64.2 | 11 | |
| 12 | Infinite | 0.92 | | | 11 | |
| 13 Display device | Infinite | | | | | |

Figure 14:
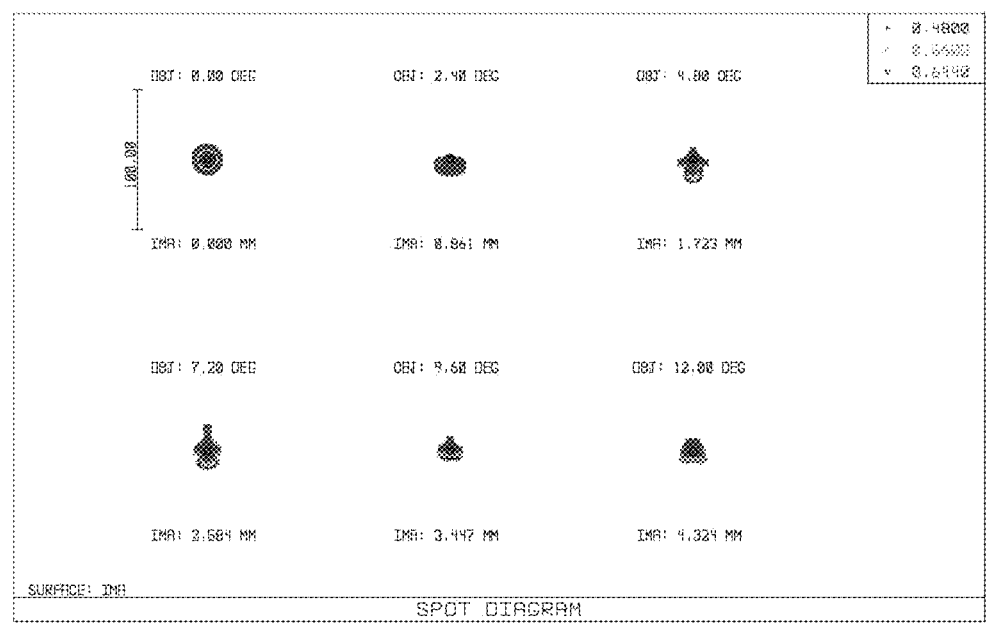
FIG. 14 is a spot diagram of the eyepiece optical system according to the fifth embodiment of the present application.

FIG. 14 has shown the spot diagram of the eyepiece optical system according to the present embodiment of the present application. As shown, the lights of different field-of-views in the present embodiment have dispersion spots of small and uniform radii on the image plane (display device I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

Figure 15A:
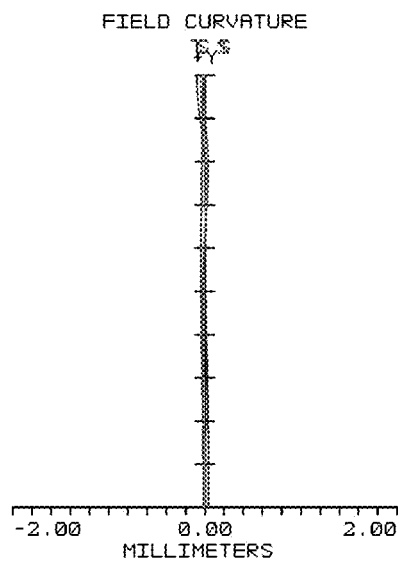
FIG. 15a is a field curve diagram of the eyepiece optical system according to the fifth embodiment of the present application.
Figure 15B:
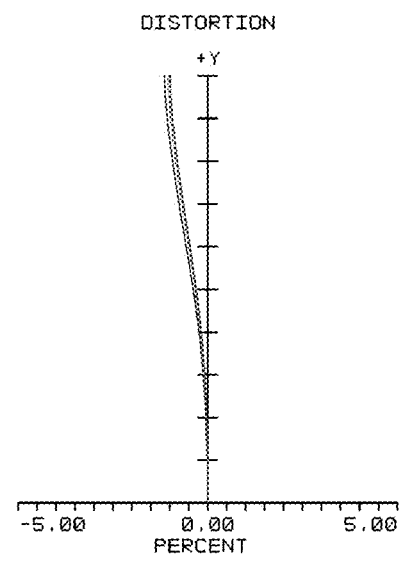
FIG. 15b is a distortion curve diagram of the eyepiece optical system according to the fifth embodiment of the present application.

FIG. 15a and FIG. 15b have respectively shown the field curvature and distortion curve of the eyepiece optical system according to the present embodiment of the present application, by which the characteristics of the present optical system such as super large field-of-view and high imaging quality and so on, have been represented.

Embodiment 6

Figure 16:
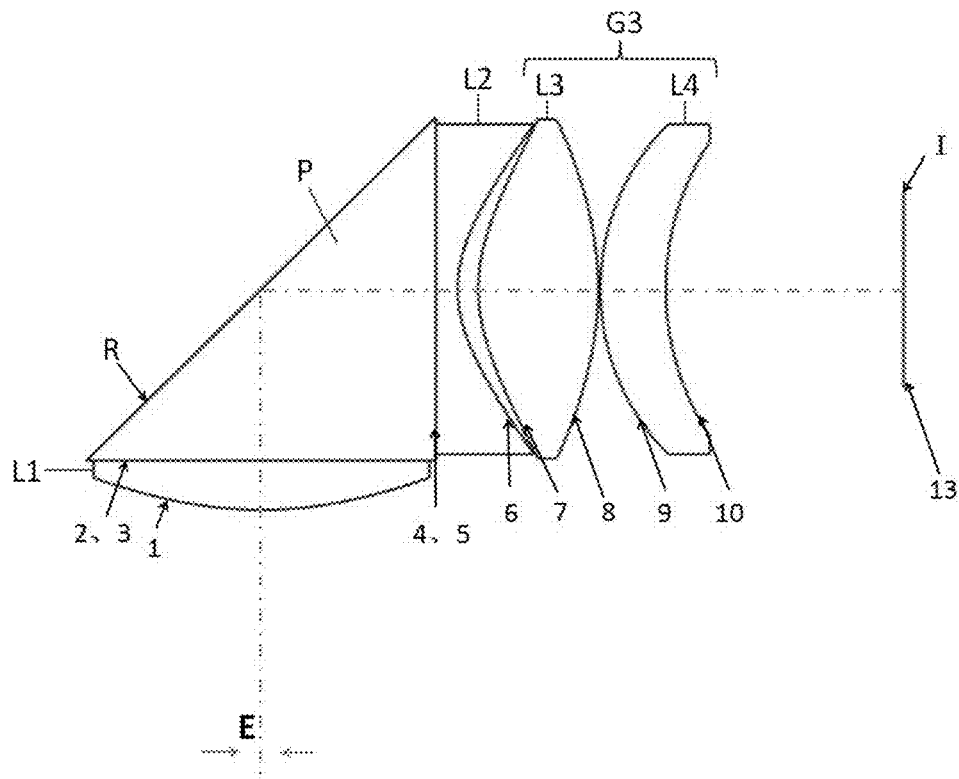
FIG. 16 is an optical path diagram of the eyepiece optical system according to a sixth embodiment of the present application.

As shown in FIG. 16, in the schematic diagram showing the optical path of the eyepiece optical system, a first lens L1, a prism P, a second lens L2, a third lens L3 and a fourth lens L4 are arranged coaxially and successively along an optical axis direction from an eye viewing side to a miniature image displayer side. The optical surface closer to the diaphragm E side has a serial number of 1, and so on (the optical surface from left to right has a serial number of 2, 3, 4, 5, 6, 7, 8, 9 and 10, respectively). And the surface of the display device I has a serial number of 13. The reflection unit has a reflection surface R. The first lens L1 is a flat convex positive lens, the second lens L2 is a flat concave negative lens, the third lens L3 is a biconvex positive lens, and the fourth lens is a crescent positive lens, wherein the first lens is cemented with the prism P, which is further cemented with the second lens L2. The present embodiment can sufficiently correct the system aberration, such as the distortion, field curvature and chromatism, and provide sufficient positive focal power with a viewing angle of 25° while guaranteeing a small volume.

TABLE 6

Optical system parameters list of Embodiment 6
Embodiment 6: effective focal length 21.2 mm, field-of-view angle 2ω = 25°

| Serial number of Surfaces | Curvature radius (mm) | Thickness (mm) | Refractive index | Abbe number | Diameter (mm) | Aspheric coefficient |
|---|---|---|---|---|---|---|
| OBJ | Infinite | Infinite | | | | |
| 1 | 17.51 | 2.3 | 1.53 | 56.0 | 15 | 2.62 |
| 2 | Infinite | 0 | | | 15 | 0 |
| 3 | Infinite | 16.2 | 1.73 | 54.7 | 15 | 0 |
| 4 | Infinite | 0 | | | 15 | 0 |
| 5 | Infinite | 1 | 1.59 | 29.9 | 15 | 0 |
| 6 | 5.66 | 0.9 | | | 15 | −1.93 |
| 7 | 7.73 | 5.5 | 1.53 | 56.0 | 16 | −1.97 |
| 8 | −14.91 | 0.1 | | | 16 | −5.43 |
| 9 | 11.10 | 3 | 1.77 | 49.6 | 15 | 0 |
| 10 | 12.74 | 10.9 | | | 15 | 0 |
| 13 Display device | Infinite | | | | | |

FIG. 17 has shown the spot diagram of the eyepiece optical system according to the present embodiment of the present application. As shown, the lights of different field-of-views in the present embodiment have dispersion spots of small and uniform radii on the image plane (display device I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

FIG. 18a and FIG. 18b have respectively shown the field curvature and distortion curve of the eyepiece optical system according to the present embodiment of the present application, by which the characteristics of the present optical system such as super large field-of-view and high imaging quality and so on, have been represented.

Embodiment 7

Figure 19:
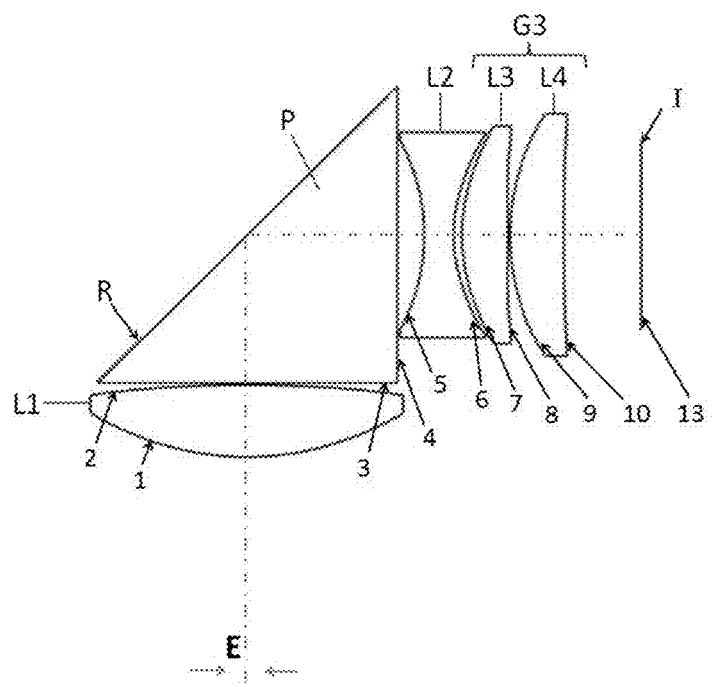
FIG. 19 is an optical path diagram of the eyepiece optical system according to a seventh embodiment of the present application.

As shown in FIG. 19, in the schematic diagram showing the optical path of the eyepiece optical system, a first lens L1, a prism P, a second lens L2, a third lens L3 and a fourth lens L4 are arranged coaxially and successively along an optical axis direction from an eye viewing side to a miniature image displayer side. The optical surface closer to the diaphragm E side has a serial number of 1, and so on (the optical surface from left to right has a serial number of 2, 3, 4, 5, 6, 7, 8, 9 and 10, respectively). And the surface of the display device I has a serial number of 13. The reflection unit has a reflection surface R. The first lens L1 is a biconvex positive lens, the second lens L2 is a biconvex negative lens, the third lens L3 is a crescent positive lens, and the fourth lens is a crescent positive lens. The present embodiment can sufficiently correct the system aberration, such as the distortion, field curvature and chromatism, and provide sufficient positive focal power with a viewing angle of 26° while guaranteeing a small volume.

TABLE 7

Optical system parameters list of Embodiment 7
Embodiment 7: effective focal length 21.8 mm, field-of-view angle 2ω = 26°

| Serial number of Surfaces | Curvature radius (mm) | Thickness (mm) | Refractive index | Abbe number | Diameter (mm) | Aspheric coefficient |
|---|---|---|---|---|---|---|
| OBJ | Infinite | Infinite | | | | |
| 1 | 13.78 | 3.5 | 1.69 | 53.2 | 15 | 1.11 |
| 2 | −59.54 | 0.1 | | | 15 | 42.82 |
| 3 | Infinite | 14.4 | 1.81 | 25.5 | 14 | 0 |
| 4 | Infinite | 1.3 | | | 14 | 0 |
| 5 | −9.61 | 1.4 | 1.63 | 23.3 | 10 | −0.10 |
| 6 | 7.06 | 0.4 | | | 10 | −0.47 |
| 7 | 9.00 | 2.2 | 1.53 | 55.7 | 11 | −2.59 |
| 8 | −75.12 | 0.1 | | | 11 | 155.98 |
| 9 | 11.00 | 2.6 | 1.69 | 31.2 | 12 | 0 |
| 10 | 108.05 | 3.7 | | | 12 | 0 |
| 13 Display device | Infinite | | | | | |

Figure 20:
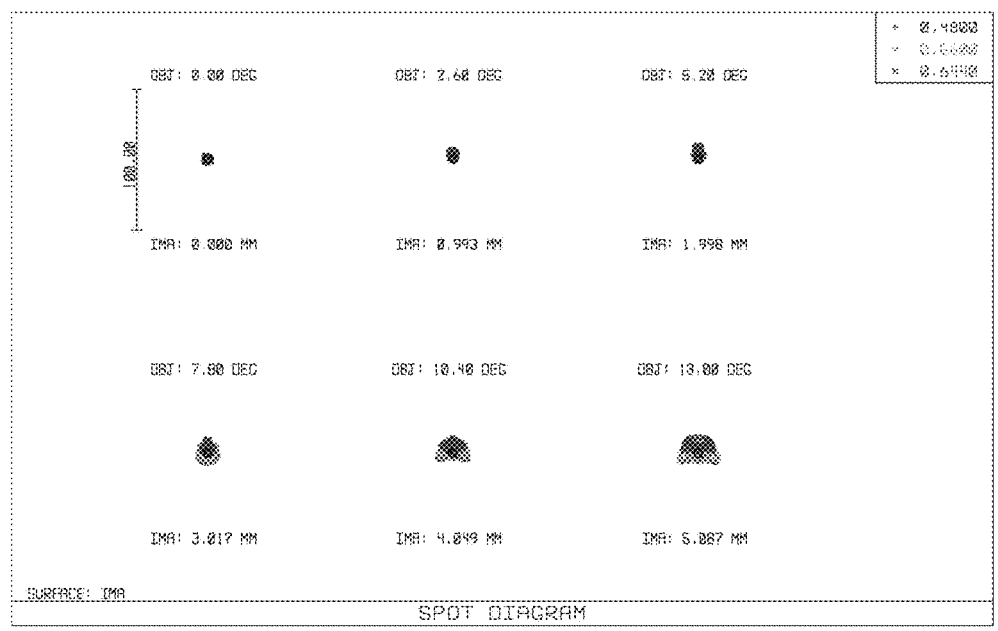
FIG. 20 is a spot diagram of the eyepiece optical system according to the seventh embodiment of the present application.

FIG. 20 has shown the spot diagram of the eyepiece optical system according to the present embodiment of the present application. As shown, the lights of different field-of-views in the present embodiment have dispersion spots of small and uniform radii on the image plane (display device I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

Figures 21A, 21B:
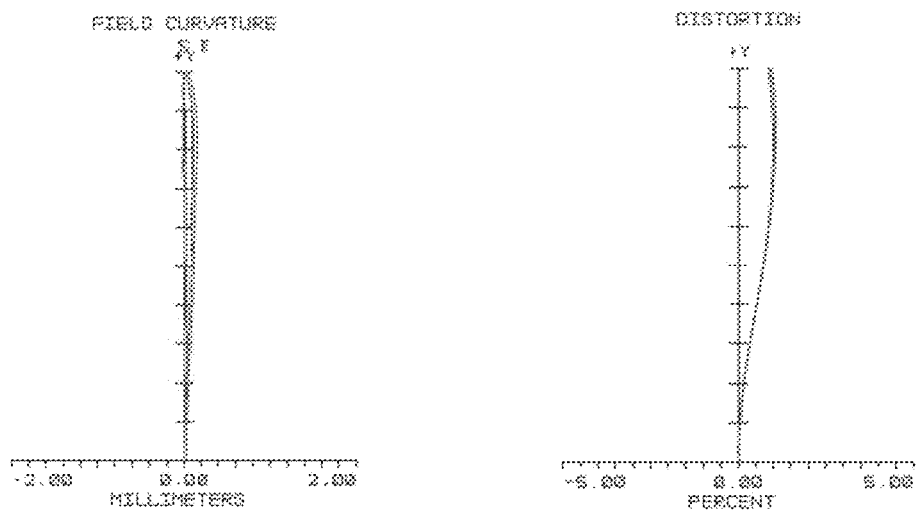
FIG. 21a is a field curve diagram of the eyepiece optical system according to the seventh embodiment of the present application.
FIG. 21b is a distortion curve diagram of the eyepiece optical system according to the seventh embodiment of the present application.

FIG. 21a and FIG. 21b have respectively shown the field curvature and distortion curve of the eyepiece optical system according to the present embodiment of the present application, by which the characteristics of the present optical system such as super large field-of-view and high imaging quality and so on, have been represented.

Embodiment 8

Figure 22:
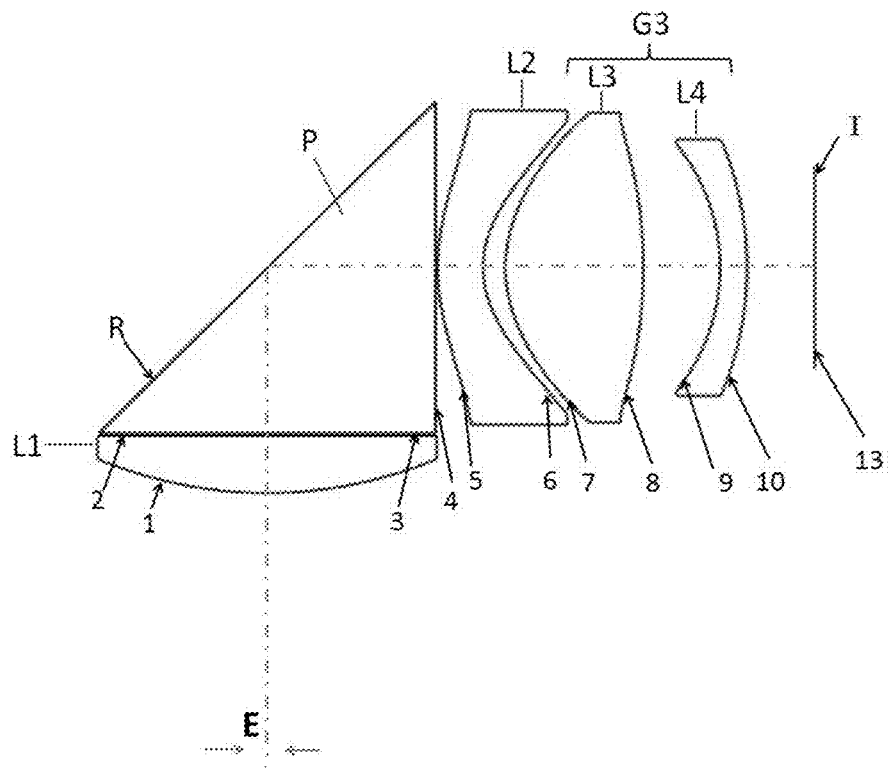
FIG. 22 is an optical path diagram of the eyepiece optical system according to an eighth embodiment of the present application.

As shown in FIG. 22, in the schematic diagram showing the optical path of the eyepiece optical system, a first lens L1, a prism P, a second lens L2, a third lens L3 and a fourth lens L4 are arranged coaxially and successively along an optical axis direction from an eye viewing side to a miniature image displayer side. The optical surface closer to the diaphragm E side has a serial number of 1, and so on (the optical surface from left to right has a serial number of 2, 3, 4, 5, 6, 7, 8, 9 and 10, respectively). And the surface of the display device I has a serial number of 13. The reflection unit has a reflection surface R. The first lens L1 is a flat convex positive lens, the second lens L2 is a crescent negative lens, the third lens L3 is a biconvex positive lens, and the fourth lens is a reversed crescent negative lens. The present embodiment can sufficiently correct the system aberration, such as the distortion, field curvature and chromatism, and provide sufficient positive focal power with a viewing angle of 28° while guaranteeing a small volume.

TABLE 8

Optical system parameters list of Embodiment 8
Embodiment 8: effective focal length 21.3 mm, field-of-view angle 2ω = 28°

| Serial number of Surfaces | Curvature radius (mm) | Thickness (mm) | Refractive index | Abbe number | Diameter (mm) | Aspheric coefficient |
|---|---|---|---|---|---|---|
| OBJ | Infinite | Infinite | | | | |
| 1 | 18.58 | 2.6 | 1.69 | 53.2 | 16 | 2.19 |
| 2 | Infinite | 0.1 | | | 16 | 0 |
| 3 | Infinite | 15.0 | 1.85 | 23.8 | 16 | 0 |
| 4 | Infinite | 0.1 | | | 16 | 0 |
| 5 | 9.85 | 2.0 | 1.63 | 23.3 | 15 | 0.36 |
| 6 | 4.34 | 1.0 | | | 15 | −0.84 |
| 7 | 6.23 | 6.1 | 1.53 | 55.7 | 14 | −2.45 |
| 8 | −23.39 | 3.4 | | | 14 | −4.33 |
| 9 | −8.98 | 1.2 | 1.70 | 30.1 | 12 | 0 |
| 10 | −15 | 3.0 | | | 12 | 0 |
| 13 Display device | Infinite | | | | | |

FIG. 23 has shown the spot diagram of the eyepiece optical system according to the present embodiment of the present application. As shown, the lights of different field-of-views in the present embodiment have dispersion spots of small and uniform radii on the image plane (display device I), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

FIG. 24a and FIG. 24b have respectively shown the field curvature and distortion curve of the eyepiece optical system according to the present embodiment of the present application, by which the characteristics of the present optical system such as super large field-of-view and high imaging quality and so on, have been represented.

Each data in embodiments 1-8 satisfies the data requirement recorded in the summary of the present application, and the results are listed in table 9.

TABLE 9

Parameter values of the Optical system in Embodiments 1-8

|  | $f_{11}/f_w$ | $f_{21}/f_w$ | $f_3/f_w$ | $f_{31}/f_w$ | $f_{32}/f_w$ |
|---|---|---|---|---|---|
| Embodiment 1 | 1.21 | −397.60 | −7.48 | 0.61 | −0.45 |
| Embodiment 2 | 1.29 | −0.61 | 0.48 | 0.55 | −78.50 |
| Embodiment 3 | 1.39 | −0.69 | 0.50 | 0.41 | −0.93 |
| Embodiment 4 | 4.50 | −0.93 | 0.46 | 0.48 | −3.79 |
| Embodiment 5 | 1.47 | −0.58 | 0.46 | 0.83 | 0.97 |
| Embodiment 6 | 1.54 | −0.45 | 0.40 | 0.49 | 2.90 |
| Embodiment 7 | 0.75 | −0.28 | 0.39 | 0.70 | 0.80 |
| Embodiment 8 | 1.25 | −0.67 | 0.53 | 0.48 | −1.63 |

In another embodiment of the present application, a head-mounted display device is provided, which comprising a miniature image display unit and an eyepiece located between the miniature image display unit and human eyes, wherein the eyepiece is any one of the eyepiece optical system discussed above.

Preferably, the miniature image displayer is an organic electroluminescent light emitting element, a transmissive liquid crystal display element or a reflective liquid crystal display element.

Preferably, a diopter of the head-mounted display device is adjusted by adjusting a distance between the miniature image displayer and the eyepiece optical system along an optical axis direction.

Preferably, the head-mounted display device is a double-eye head-mounted display device comprising two same eyepiece optical systems discussed above.

To sum up, following technical effects can be obtained by the eyepiece optical system according to the above embodiments of the present application. The eyepiece optical system has advantages such as compact structure, small size, high optical resolution and so on, and its exit pupil diameter is larger than that of the common eyepiece. The present eyepiece optical system can adopt spherical lens and aspherical lens collocation, optical plastic and glass combination, thus eliminating the system aberration significantly while reducing the manufacturing costs and product weight, especially obtaining optical indices such as low distortion, smaller chromatism, field curvature and astigmatism, and so on at the same time. Such that the observer can watch large images of full frame, high definition and uniform image quality without any distortion and get visual experience of high liveness via the eyepiece optical system according to the present application.

It should be understood that, for one skilled in the art, the foregoing description can be modified or altered, and all such modifications and alterations fall into the scope of the attached claims.

What claimed is:

1. An eyepiece optical system for near-eye display comprising a first lens, a reflection unit, a second lens, and a third lens group arranged coaxially and successively along an optical axis direction from an eye viewing side to a miniature image displayer side, wherein an optical axis of the second lens and an optical axis of the third lens group are coaxially with each other and perpendicular to the miniature image displayer, wherein the optical axis of the second lens and the optical axis of the third lens group are coaxially with an optical axis of the first lens when they are reflected by the reflection unit, wherein the third lens group at least comprises a third lens;

wherein the second lens and the third lens have optical aspheric face shapes, and the first lens is the only one lens arranged between the reflection unit and the eye viewing side; wherein an effective focal length $f_{11}$ of the first lens, an effective focal length $f_{21}$ of the second lens, an effective focal length $f_{31}$ of the third lens, and an effective focal length $f_w$ of the eyepiece optical system satisfy following relations (1), (2) and (3), respectively:

$$0.75 < f_{11}/f_w < 4.5 \quad (1);$$

$$f_{21}/f_w < -0.28 \quad (2);$$

$$0.33 < f_{31}/f_w < 0.83 \quad (3);$$

wherein an optical surface of the first lens proximate to the eye viewing side is convex to an eye viewing direction and an optical surface of the second lens proximate to the miniature image displayer side is concave to a miniature image displayer direction, wherein the third lens is a biconvex lens;

wherein the third lens group further comprises a fourth lens proximate to the miniature image displayer;

wherein an effective focal length $f_{32}$ of the fourth lens, and the effective focal length $f_w$ of the eyepiece optical system satisfy following relation (4):

$$|f_{32}/f_w| > 0.45 \quad (4).$$

2. The eyepiece optical system according to claim 1, wherein the first lens is an aspheric lens.

3. The eyepiece optical system according to claim 1, wherein the reflection unit is a sheet having a reflection function comprising a base layer of glass, plastic or other inorganic materials and a reflective coating layer.

4. The eyepiece optical system according to claim 1, wherein the reflection unit is an optical prism.

5. The eyepiece optical system according to claim 4, wherein an optical surface of the first lens proximate to a reflection unit side is a plane.

6. The eyepiece optical system according to claim 4, wherein an optical surface of the second lens proximate to a reflection unit side is a plane.

7. The eyepiece optical system according to claim 1, wherein an optical surface of the fourth lens proximate to the miniature image displayer is concave to the miniature image displayer.

8. The eyepiece optical system according to claim 4, wherein an optical plane of the first lens is cemented with a neighbor plane of the optical prism, or an optical plane of the second lens is cemented with a neighbor plane of the optical prism, or each two of the first lens, the second lens and the optical prism are cemented with each other.

9. The eyepiece optical system according to claim 5, wherein an optical plane of the first lens is cemented with a neighbor plane of the optical prism, or an optical plane of the second lens is cemented with a neighbor plane of the optical prism, or each two of the first lens, the second lens and the optical prism are cemented with each other.

10. The eyepiece optical system according to claim 6, wherein an optical plane of the first lens is cemented with a neighbor plane of the optical prism, or an optical plane of the second lens is cemented with a neighbor plane of the optical prism, or each two of the first lens, the second lens and the optical prism are cemented with each other.

11. The eyepiece optical system according to claim 3, wherein a turning angle θ of the reflection unit relative to an optical axis of the eyepiece optical system satisfies following relation (6):

$$\theta = 90° \quad (6).$$

12. The eyepiece optical system according to claim 4, wherein a turning angle θ of the reflection unit relative to an optical axis of the eyepiece optical system satisfies following relation (6):

$$\theta = 90° \quad (6).$$

13. The eyepiece optical system according to claim 1, wherein the effective focal length $f_{11}$ of the first lens further satisfies following relation (7):

$$1.05 < f_{11}/f_w < 2.68 \quad (7).$$

14. The eyepiece optical system according to claim 1, wherein the effective focal length $f_{21}$ of the second lens, the effective focal length $f_{31}$ of the third lens, and the effective focal length $f_{32}$ of the fourth lens further satisfy following relations (8), (9) and (5):

$$f_{21}/f_w < -0.3 \quad (8);$$

$$0.414 < f_{31}/f_w < 0.58 \quad (9);$$

$$|f_{32}/f_w| > 0.86 \quad (5).$$

15. The eyepiece optical system according to claim 1, wherein the first lens, the second lens and the third lens are made of glass materials or plastic materials.

16. The eyepiece optical system according to claim 1, wherein a PBS prism or a sheet-type PBS is arranged along the optical axis direction between the third lens group and the miniature image displayer.

17. A head-mounted display device comprising a miniature image displayer and an eyepiece optical system located between the miniature image displayer and human eyes, wherein the eyepiece optical system comprising a first lens, a reflection unit, a second lens, and a third lens group arranged coaxially and successively along an optical axis direction from an eye viewing side to a miniature image displayer side, wherein an optical axis of the second lens and an optical axis of the third lens group are coaxially with each other and perpendicular to the miniature image displayer, wherein the optical axis of the second lens and the optical axis of the third lens group are coaxially with an optical axis of the first lens when they are reflected by the reflection unit, wherein the third lens group at least comprises a third lens;

wherein the second lens and the third lens have optical aspheric face shapes, and the first lens is the only one lens arranged between the reflection unit and the eye viewing side; wherein an effective focal length $f_{11}$ of the first lens, an effective focal length $f_{21}$ of the second lens, an effective focal length $f_{31}$ of the third lens, and an effective focal length $f_w$ of the eyepiece optical system satisfy following relations (1), (2) and (3), respectively:

$$0.75 < f_{11}/f_w < 4.5 \quad (1);$$

$$f_{21}/f_w < -0.28 \quad (2);$$

$$0.33 < f_{31}/f_w < 0.83 \quad (3);$$

wherein an optical surface of the first lens proximate to the eye viewing side is convex to an eye viewing direction and an optical surface of the second lens proximate to the miniature image displayer side is concave to a miniature image displayer direction, wherein the third lens is a biconvex lens;

wherein the third lens group further comprises a fourth lens proximate to the miniature image displayer;

wherein an effective focal length $f_{32}$ of the fourth lens, and the effective focal length $f_w$ of the eyepiece optical system satisfy following relation (4):

$$|f_{32}/f_w| > 0.45 \quad (4).$$

18. The head-mounted display device according to claim 17, wherein the miniature image displayer is an organic electroluminescent light emitting element, a transmissive liquid crystal display element or a reflective liquid crystal display element.

19. The head-mounted display device according to claim 18, wherein a diopter of the head-mounted display device is adjusted by adjusting a distance between the miniature image displayer and the eyepiece optical system along the optical axis direction.

20. The head-mounted display device according to claim 19, wherein the head-mounted display device is a double-eye head-mounted display device comprising same two of the eyepiece optical systems.

* * * * *